United States Patent

Risley et al.

[15] 3,643,781
[45] Feb. 22, 1972

[54] DEADPLATE CONSTRUCTION FOR A CONVEYOR SYSTEM

[72] Inventors: Robert F. Risley, Wauwatosa; Wayne A. Smith, Shorewood, both of Wis.

[73] Assignee: Jos. Schlitz Brewing Company, Milwaukee, Wis.

[22] Filed: May 27, 1970

[21] Appl. No.: 40,807

[52] U.S. Cl. ............................................198/28, 198/102
[51] Int. Cl. ....................................B65g 47/04, B65g 47/57
[58] Field of Search...........................198/28, 22, 102, 78–81

[56] References Cited

UNITED STATES PATENTS

| | | | |
|---|---|---|---|
| 2,237,345 | 4/1941 | Frentzel | 198/28 |
| 2,736,420 | 2/1956 | McCarthy | 198/102 X |

*Primary Examiner*—Edward A. Sroka
*Attorney*—Andrus, Sceales, Starke & Sawall

[57] ABSTRACT

A conveyor system including a pair of conveyors located at right angles with respect to each other. An inclined deadplate is mounted adjacent the side edge of one conveyor and the high end of the deadplate abuts the side edge of the second conveyor. Guide rails are mounted above the conveyors and the articles to be conveyed are conveyed over the first conveyor across the deadplate and drop from the high edge of the deadplate onto the second conveyor.

7 Claims, 6 Drawing Figures

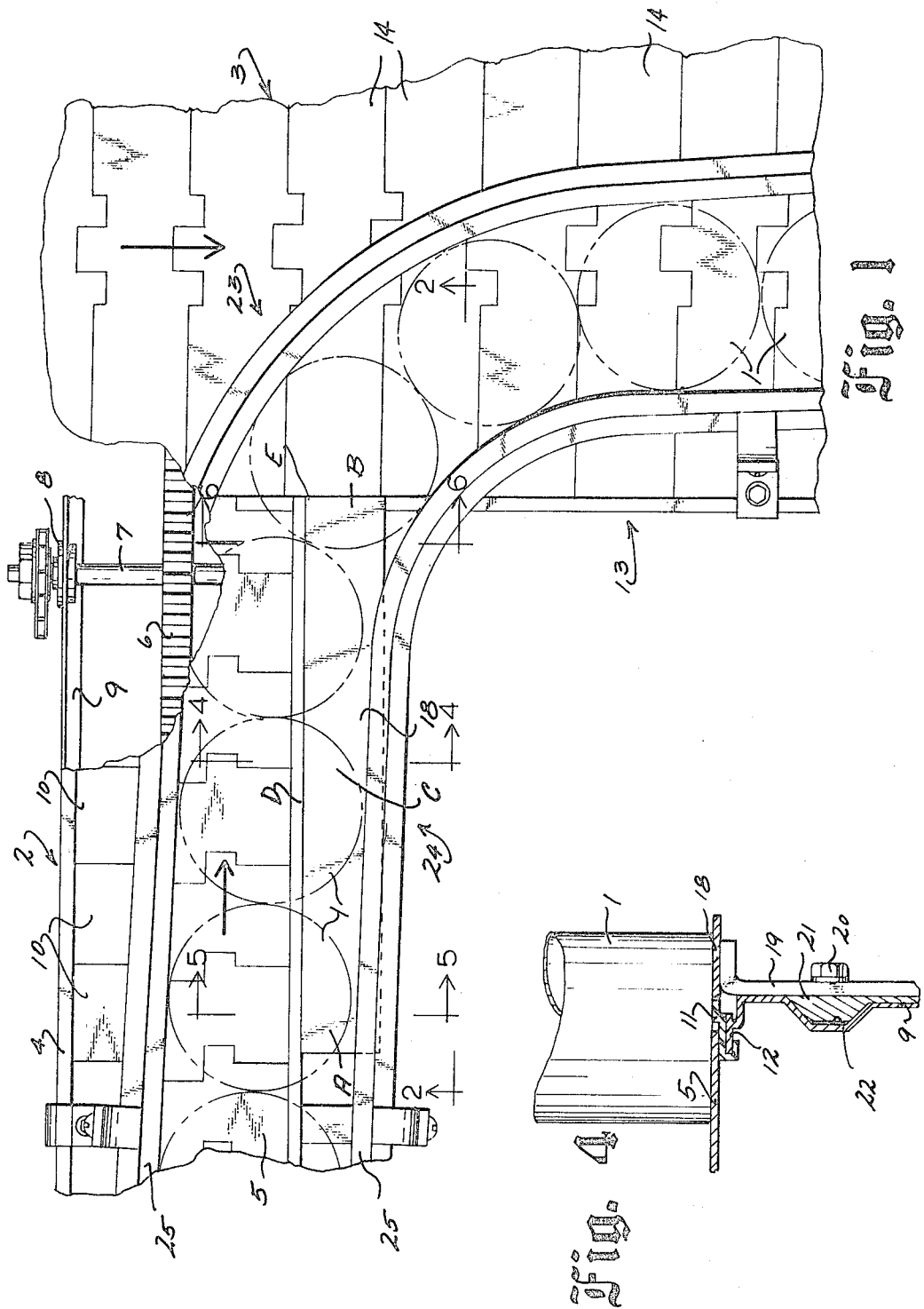

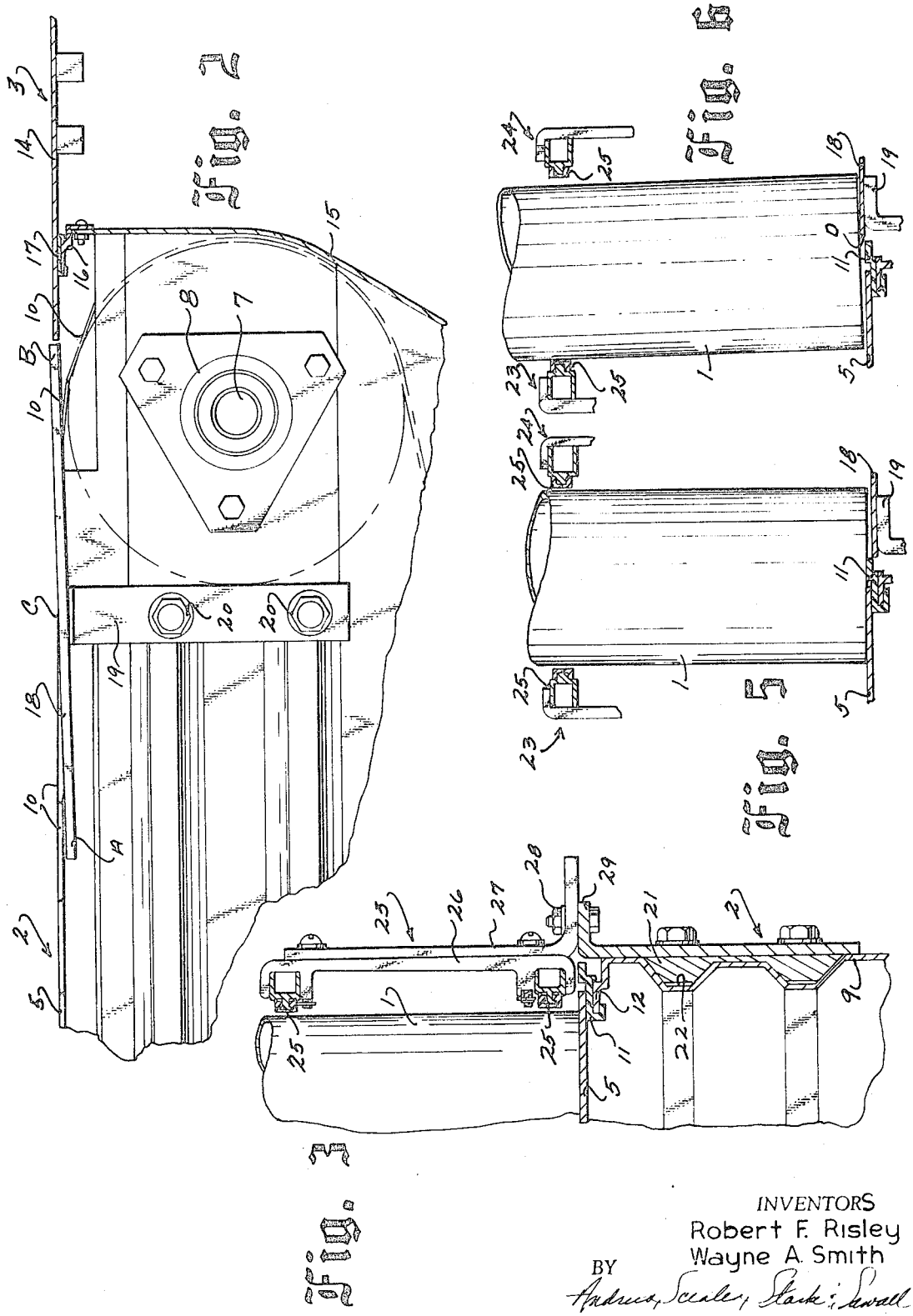

DEADPLATE CONSTRUCTION FOR A CONVEYOR SYSTEM

This invention relates to a conveying system and more particularly to a deadplate construction for transferring articles from one conveyor to a second conveyor located at right angles with respect to the first conveyor.

In a conveying system, such as that employed in a brewery for conveying cans or bottles, the articles travelling on one conveyor are frequently transferred to a second conveyor operating at 90° with respect to the first conveyor, and this side edge of the second conveyor abuts the end of the first conveyor. The conveyors are normally formed of an endless link belt composed of a series of interconnected metal links and as the link belt of the first conveyor travels downwardly, around the sprocket at the end of its path of travel there is a gap between the end of the first conveyor and the side edge of the second conveyor. To span this gap and enable the articles to pass smoothly from the first conveyor to the second conveyor, a stationary deadplate is normally mounted in the gap and is positioned flush with both the first and second conveyors.

In the conventional conveying system, the setting of the deadplate is very critical. As the link belt is formed of a number of generally flat interconnected metal links, the ends of the links inscribe a larger circular path when moving around the sprocket at the end of the path of travel of the chain than the midportions of the links. Thus, the deadplate must be spaced from the arc of travel inscribed by the ends of the links and this provides a substantial gap between the deadplate and the midportions of the links. To minimize this gap, the edge of the deadplate is generally tapered and this sharp tapered edge, if not precisely set, provides a projection which can be engaged by the cans, causing the cans to stumble or tilt. Moreover, the tapered edge of the deadplate can be readily bent or deformed and in some cases, if bent downwardly, the edge can hook into the conveyor links to jam the entire mechanism.

As a further disadvantage, broken glass or other particles often lodge within the gap between the edge of the deadplate and the conveyor links, also causing the mechanism to jam.

The present invention is directed to a conveyor system having an improved deadplate construction which overcomes the problems associated with prior art deadplates. In accordance with the invention, an inclined deadplate is mounted adjacent the side edge of one conveyor and the high end of the deadplate abuts the side edge of the second conveyor which is travelling at 90° with respect to the first conveyor. Guide rails are mounted above the conveyors and serve to guide the articles from the first conveyor across the deadplate to the second conveyor. As the articles move along the deadplate they are moved up the inclined surface and drop from the high end of the deadplate onto the second conveyor.

The conveying system of the invention utilizing the improved deadplate construction enables bottles or cans to be transferred at high speed from one conveyor to another and is particularly adaptable for use with bottles having a small diameter and a high center of gravity, such as 7 oz. beer bottles.

Due to the fact that there is no tapered edge on the deadplate which can be subjected to wear or damage, the deadplate can be used for extended periods of time without replacement. In the event it is necessary to replace the deadplate, it can be readily removed and replaced with minimum downtime of the conveying system.

As the deadplate is positioned immediately adjacent the edges of both conveyors, there is no gap between the deadplate and the conveyors and this reduces the tendency for glass or other particles to become lodged between the deadplate and the moving conveyor elements.

Other objects and advantages will appear in the course of the following descriptions.

The drawings illustrate the best mode presently contemplated of carrying out the invention.

In the drawings:

FIG. 1 is a plan view of the conveyor system of the invention;

FIG. 2 is a vertical section taken along line 2—2 of FIG. 1;

FIG. 3 is a vertical section showing the construction of the guide rails;

FIG. 4 is a fragmentary section taken along lines 4—4 of FIG. 1 and showing a bottle being supported by the deadplate;

FIG. 5 is a diagrammatic vertical section taken on the line 5—5 of FIG. 1; and

FIG. 6 is a view similar to FIG. 5 taken on line 6—6 of FIG. 1.

The drawings illustrate a conveying system for conveying articles 1 or packages, such as cans, bottles, or the like. The conveying systems consists of a conveyor 2 and a conveyor 3 which is mounted at right angles with respect to the conveyor 2. The conveyors are operated in the direction of the arrows, as shown in FIG. 1, with the articles 1 being conveyed from the conveyor 2 to the conveyor 3.

The conveyor 2 includes a structural frame 4 and an endless link belt 5 is mounted for endless travel on the frame 4. The belt 5 is driven by sprocket 6, and sprocket 6 is secured to a transverse shaft 7 journaled within bearings 8 mounted in the side wall 9 of frame 4.

The endless belt is a conventional type being composed of a series of interconnected, generally flat, metal links 10 having knuckles or lugs on their undersurface which engage the sprocket 6.

As best shown in FIG. 3 the side edges of the conveyor belt 5 are supported on plastic wear strips 11 secured to the outwardly extending flanges 12 on the side walls 9 of frame 4.

The conveyor 3 has a similar construction to that of conveyor 2 and includes a structural frame 13 with a link belt 14 mounted for movement in an endless path on the frame 13. As shown in FIG. 2, a portion of the sidewall 15 of the frame 13 is curved inwardly to accommodate the sprocket 6 of the conveyor 2, and a bracket 16 is mounted on the upper end of the wall 15 and carries a wear strip 17, similar to wear strip 11, which supports the edge of the link belt conveyor 14.

The conveyors 2 and 3 are of conventional construction and can be constructed in accordance with the conveyor shown in the copending U.S. Pat. application, Ser. No. 870,033, filed Oct. 28, 1969.

According to the invention, a stationary deadplate 18 is mounted adjacent the side edge of the conveyor 2 and is disposed at a slight angle of about 1° to 5° and preferably about 3° with respect to the horizontal. To mount the deadplate on the conveyor, the upper flange of a bracket 19 is secured to the underside of the deadplate and the central portion of the bracket is connected by bolts 20 to an insert 21 having a series of ridges which are received within complementary grooves 22 in the sidewall 9 of the conveyor frame 4. The side edge of deadplate 18 is located immediately adjacent the side edge of wear strip 11, as shown in FIG. 4, with a minimum clearance between the two members.

The deadplate, as previously noted, is slightly inclined with the portion of the deadplate vertically aligned with the bracket 19 being substantially flush with the belt 5 while the left-hand portion of the deadplate, as viewed in FIG. 2, is slightly below the level of the conveyor 5, while the right-hand portion of the deadplate, as viewed in FIG. 2, is slightly above the level of the belt 5 and the belt 14.

A pair of guide rail assemblies 23 and 24 are mounted above the conveyors 2 and 3 and serve to guide the bottles or cans 1 in travel. Each guide rail assembly 23 and 24 includes a pair of guide strips 25 which are supported in recesses in uprights 26 and each upright, as shown in FIG. 3, is mounted on a generally L-shaped bracket 27. The lower horizontal flange of the bracket 27 is connected by bolt 28 to the upper flange of an arm 29 attached through an insert 21 to the sidewall 9 of the conveyor. Bolt 28 extends through a slot in the flange of bracket 27 and the slotted connection provides a degree of lateral adjustment for the guide strips 25. In addition, by reversing the position of the L-shaped brackets 27, a further degree of lateral adjustment of the guide strips 25 can be obtained.

The guide strips 25 of the guide rail assemblies 23 and 24 are spaced apart a distance just slightly greater than the diameter of the bottles or cans 1 being conveyed. As the bottles 1 move along the conveyor 2, the end portion of the deadplate 18, indicated by A, will be beneath the level of the link belt 5 so that the bottles 1 will not supported on the portion A of the deadplate. This is illustrated in FIG. 5. As the bottles approach the longitudinal center of the deadplate, as indicated by C, which is flush with the level of the belt 5, the bottles will then be supported on both the deadplate and the belt 5. As the bottles 1 are further advanced along the conveyor 2, the bottles will move along the end portion B of the deadplate which is at an elevation above the level of the link belt 5. As the side edge of the deadplate is located less than one-half the distance between the guide rails 23 and 24, the bottles will tend to tilt as illustrated in FIG. 6. Due to the spacing between the guide rails 23 and 24 the bottom of the bottle 1 will not be engaged with the conveyor belt 5, but will merely be supported on the edge D of the deadplate.

As the bottle advances to the high end of the deadplate 18, the corner E of the deadplate will be approximately one-half the distance between the guide rails 23 and 24 so that when the bottle is above the corner E it will be generally horizontal and supported solely by the deadplate. With further movement of the bottle, the bottle will ride over the high end of the deadplate and onto the conveyor belt 14 of the conveyor 3.

The deadplate construction of the invention provides substantial advantages in that the deadplate can be mounted in abutting relation with the stationary wear strip on the conveyor so that there is no substantial gap between the deadplate and the conveyor into which glass or other foreign material can lodge to jam the mechanical system.

The conveying system is capable of transferring small diameter bottles or cans having a relatively high center of gravity, such as 7 oz. beer bottles, at high speeds from one conveyor to the other without tipping of bottles.

As there are no sharp or tapered edges on the deadplate, potential damage to the deadplate is eliminated thereby resulting in lower maintainence costs and less downtime for the conveying system.

Various modes of carrying out the invention are contemplated as being within the scope of the following claims which particularly point out and distinctly claim the subject matter which is regarded as the invention.

I claim:

1. In a conveying system, first conveyor means including a first generally horizontal conveying member, second conveyor means including a second generally horizontal conveying member disposed in a common plane with said first conveying member, the side edge of the second conveying member being disposed adjacent an end of said first conveying member so that articles can be conveyed from said first conveying member to said second conveying member, an inclined stationary deadplate mounted adjacent the side edge of the first conveying member and having an end disposed adjacent the second conveying member, said end being at a level slightly above said second conveying member and a portion of said deadplate spaced from said end being disposed at substantially the same level as said first conveying member, and guide means mounted above said first and second conveying means for guiding the articles from the first conveying member across the deadplate to the second conveying member.

2. In a conveying system, conveyor means including a first conveying surface, a second conveyor means including a second conveying surface disposed in a common horizontal plane with said first conveying surface and disposed at an angle with respect to said first conveying surface whereby articles can be transferred from said first conveying surface to said second conveying surface, an inclined stationary deadplate having a first edge mounted adjacent the side edge of the first conveying surface and having a second edge mounted adjacent the side edge of said second conveying surface, said second edge being disposed at a level above said horizontal plane and said first edge being inclined downwardly from said second edge to a level beneath said horizontal plane, and guide means disposed above said first and second conveying means for guiding articles from said first conveying surface across said deadplate to said second conveying surface.

3. The structure of claim 2, wherein said guide means includes a pair of spaced guide rails with the spacing between said guide rails being slightly greater than the width of the articles being conveyed.

4. The conveying system of claim 3, wherein said first edge and said second edge are joined together at a corner and said corner is located substantially equidistant between said guide rails.

5. The structure of claim 3, wherein said first edge and said second edge of said deadplate are located between the said first and second guide rails.

6. The structure of claim 3, wherein a central portion of the length of said first edge is at the level of said horizontal plane.

7. The conveying system of claim 2, wherein the deadplate is disposed at an angle of 1° to 5° to said horizontal plane.

* * * * *